(12) United States Patent
Chauhan et al.

(10) Patent No.: US 11,055,205 B1
(45) Date of Patent: Jul. 6, 2021

(54) REGRESSION TESTING USING AUTOMATION TECHNOLOGIES

(71) Applicant: EMC IP Holding Company LLC, Hopkinton, MA (US)

(72) Inventors: Surendra Chauhan, Bangalore (IN); Udit Tyagi, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/819,293

(22) Filed: Mar. 16, 2020

(51) Int. Cl.
*G06F 11/36* (2006.01)

(52) U.S. Cl.
CPC ...... *G06F 11/3664* (2013.01); *G06F 11/3684* (2013.01); *G06F 11/3688* (2013.01)

(58) Field of Classification Search
None
See application file for complete search history.

(56) References Cited

U.S. PATENT DOCUMENTS

| | | | | |
|---|---|---|---|---|
| 5,694,540 A | * | 12/1997 | Humelsine | G06F 8/71 714/33 |
| 10,223,240 B2 | | 3/2019 | Bhojan | |
| 10,318,413 B1 | * | 6/2019 | Wilson | G06F 11/3688 |
| 10,509,719 B2 | | 12/2019 | Shani et al. | |
| 10,678,679 B1 | * | 6/2020 | Sonawale | G06F 11/3684 |
| 2019/0034320 A1 | * | 1/2019 | Stokes | G06F 11/3692 |
| 2020/0019493 A1 | | 1/2020 | Ramakrisna | |

OTHER PUBLICATIONS

Wikipedia, Selenium (software), Feb. 18, 2020.

* cited by examiner

*Primary Examiner* — Ryan D. Coyer
(74) *Attorney, Agent, or Firm* — Ryan, Mason & Lewis, LLP (57) ABSTRACT

Methods, apparatus, and processor-readable storage media for regression testing using automation technologies are provided herein. An example computer-implemented method includes generating application programming interfaces related to regression testing; obtaining user input, via at least one user interface, pertaining to at least one regression testing test case; selecting at least one of the application programming interfaces based at least in part on the user input; generating at least one regression testing automation tool using the at least one selected application programming interface and at least a portion of one or more software testing automation technologies; and performing one or more automated actions utilizing the at least one generated regression testing automation tool.

20 Claims, 6 Drawing Sheets

FIG. 1

```
public static void clickOnElement (String Htmltag, String HtmlAttr, String val) {
    // Get the web driver reference: org.openqa.automation
technology.chrome.ChromeDriver
    // Evaluate the CSS or XPath using input parameters
    String path = getCssOrXPath(Htmltag, HtmlAttr, val);
    WebElement ele = null; // org.openqa.automation technology.WebElement;
    try {
            ele = getWebElement(path);
    } catch (Exception ex) {
            system.out.print("Exception on the web page");
    }
    ele.click(); // clicking on this element on webpage
}
```

REGRESSION TESTING USING AUTOMATION TECHNOLOGIES

FIELD

The field relates generally to information processing systems, and more particularly to techniques for software development in such systems.

BACKGROUND

Successive software development cycles commonly require repeated execution of test suites, generally through the use of regression testing. However, conventional regression testing approaches, aimed at ensuring that previously-developed iterations of software maintain performance levels after one or more program or code changes, typically include time-consuming, labor-intensive, and error-prone manual processes.

SUMMARY

Illustrative embodiments of the disclosure provide techniques for regression testing using automation technologies. An exemplary computer-implemented method includes generating multiple application programming interfaces (APIs) related to regression testing, and obtaining user input, via at least one user interface, pertaining to at least one regression testing test case. The method also includes selecting at least one of the multiple APIs based at least in part on the user input, and generating at least one regression testing automation tool using the at least one selected API and at least a portion of one or more software testing automation technologies. Further, the method additionally includes performing one or more automated actions utilizing the at least one generated regression testing automation tool.

Illustrative embodiments can provide significant advantages relative to conventional regression testing approaches. For example, problems associated with time-consuming, labor-intensive, and error-prone manual testing processes are avoided in one or more embodiments through the generation and implementation of targeted APIs in conjunction with automation technologies.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
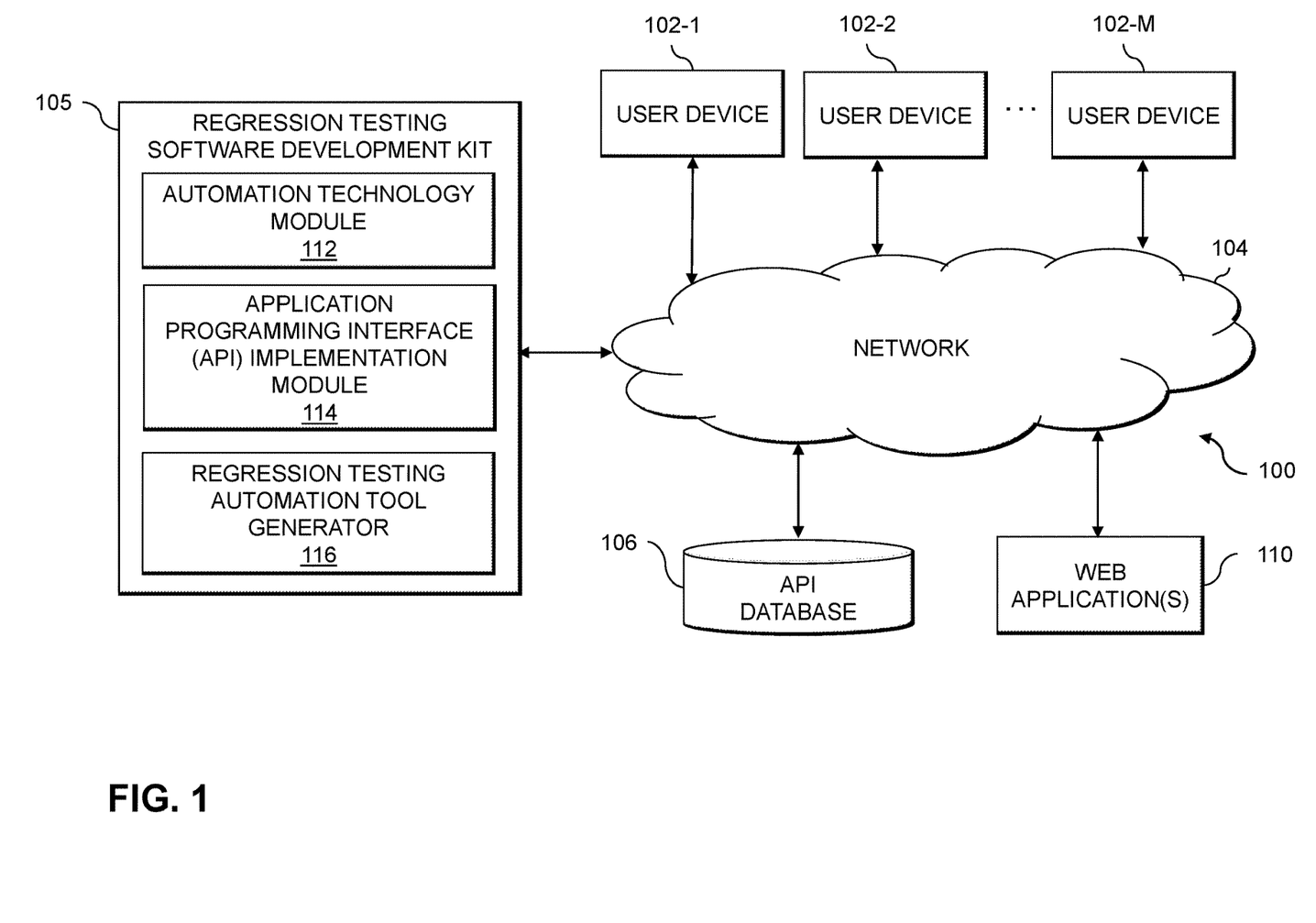
FIG. 1 shows an information processing system configured for regression testing using automation technologies in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is regression testing software development kit (SDK) 105 and web application(s) 110 (e.g., applications for executing regression testing test cases using a regression testing automation tool generated by the regression testing SDK 105 in connection with one or more embodiments).

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the regression testing SDK 105 can have an associated database 106 configured to store data pertaining to APIs generated for use in regression testing automation tools. An example of such an API is detailed, for instance, in connection with FIG. 2.

The database 106 in the present embodiment is implemented using one or more storage systems associated with regression testing SDK 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with regression testing SDK 105 can be input-output devices, which illustratively comprise keyboards, displays or other types of input-output devices in any combination. Such input-output devices can be used, for example, to support one or more user interfaces to regression testing SDK 105, as well as to support communication between user regression testing SDK 105 and other related systems and devices not explicitly shown.

Additionally, the regression testing SDK 105 in the FIG. 1 embodiment is assumed to be implemented using at least one processing device. Each such processing device generally comprises at least one processor and an associated memory, and implements one or more functional modules for controlling certain features of the regression testing SDK 105.

More particularly, the regression testing SDK 105 in this embodiment comprises a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the regression testing SDK 105 to communicate over the network 104 with the user devices 102, and illustratively comprises one or more conventional transceivers.

The regression testing SDK 105 further comprises an automation technology module 112, an API implementation module 114, and a regression testing automation tool generator 116.

It is to be appreciated that this particular arrangement of modules 112, 114 and 116 illustrated in the regression testing SDK 105 of the FIG. 1 embodiment is presented by way of example only, and alternative arrangements can be used in other embodiments. For example, the functionality associated with the modules 112, 114 and 116 in other embodiments can be combined into a single module, or separated across a larger number of modules. As another example, multiple distinct processors can be used to implement different ones of the modules 112, 114 and 116 or portions thereof.

At least portions of the modules 112, 114 and 116 may be implemented at least in part in the form of software that is stored in memory and executed by a processor.

It is to be understood that the particular set of elements shown in FIG. 1 for regression testing using automation technologies involving user devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 112, 114 and 116 of an example regression testing SDK 105 in computer network 100 will be described in more detail with reference to the flow diagram of FIG. 4.

Accordingly, at least one embodiment includes regression testing solutions for graphical user interface (GUI) management and integration with one or more other software development tools. By way of example, GUI-based products can be challenging to maintain in terms of testing, as a minor change in one window can affect other areas. Accordingly, in many contexts, it is mandatory to carry out end-to-end verification to deliver a GUI-based product. Using at least one embodiment of the invention, test cases can be automated to test GUI-based products. In such an embodiment, each event (e.g., each click) triggered in a GUI can be handled using one or more APIs provided in connection with the SDK. As such, a test case can be written once and executed any time a regression is requested and/or sought.

In one or more embodiments, such regression testing solutions take the form of at least one SDK framework generated and/or implemented in conjunction with and/or on top of one or more automation technologies (e.g., Selenium and other open source technologies for automating tests carried out on web browsers). Such an embodiment also includes providing and/or populating the SDK with multiple targeted and/or testing-related APIs to facilitate efficient automation tool development. By way merely of example, such an embodiment can be implemented in use cases such as quality assurance (QA) regression testing.

As further detailed herein, at least one embodiment includes enabling automation of regression testing test cases based on one or more particular product and/or user requirements. Such an embodiment includes generating and/or maintaining multiple APIs which are configurable (e.g., different products and/or implementation can be utilized as the basis for use of the SDK to write a customized automation tool). APIs of regression tools implemented in connection with at least one embodiment can be coupled according with a sequence of steps. By way of example, consider a use case including a login to a web application, wherein the sequence of API-related coupling steps can include: (1) launch the application uniform resource locator (URL) in a web browser; (2) enter the username and password; (3) click on the login button; and (4) check the welcome page.

Accordingly, in such an example embodiment, a regression tool will automate such steps via a unit testing framework method. A separate method can be implemented for login, and that method can perform all the above-noted example steps, for instance, using at least one API, validate the welcome page via a text pattern match, and return a success or failure notification for the login.

For example, such APIs might include the following: an API pertaining to clicking on a hypertext markup language (HTML) tag, which can include public static void clickOnElement (String HtmlTag, String HtmlAttr, String Val);

an API pertaining to selecting an HTML tag, which can include public static void SelectField (String HtmlTag, String HtmlAttr, String Val); an API pertaining to entering data on an HTML page; and an API pertaining to navigation on links.

Additionally, as further detailed herein, users of such APIs, in conjunction with one or more embodiments, do not need to know the internals of the associated automation technology. In at least one such embodiment, a user need only know the name of the web element to be passed, and one or more of the APIs will carry out the related task(s) on behalf of the user.

Figure 2:
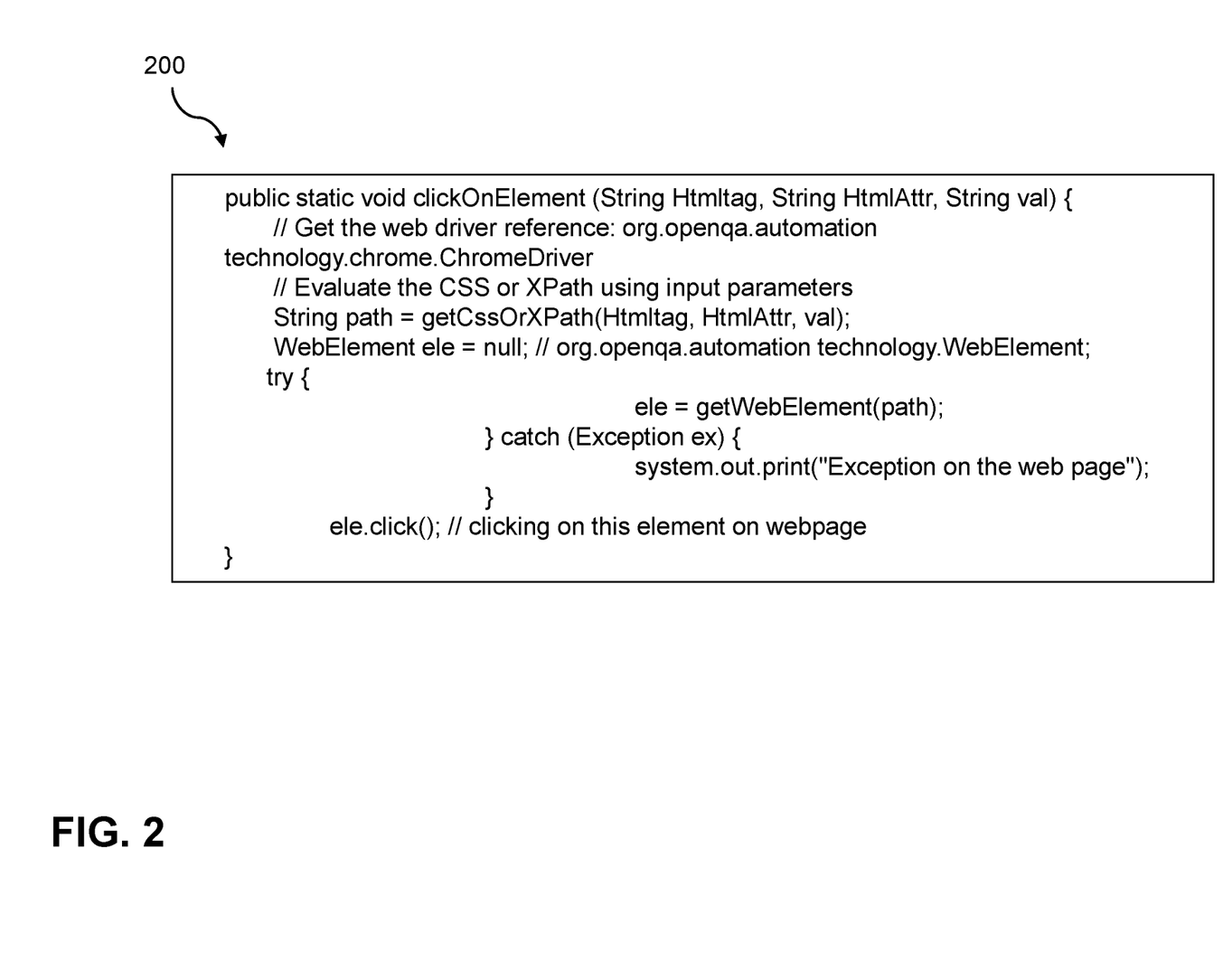
FIG. 2 shows an example code snippet for the generation of an example API in an illustrative embodiment.

FIG. 2 shows an example code snippet for the generation of an example API (e.g., a click API) in an illustrative embodiment. In this embodiment, example code snippet 200 is executed by or under the control of at least one processing device. For example, the example code snippet 200 may be viewed as comprising a portion of a software implementation of at least part of regression testing SDK 105 of the FIG. 1 embodiment.

In connection with the example code snippet 200, if a user wishes to login to a particular web application, the user needs to enter credentials and engage a login and/or submit button. For example, using a clickOnHtml API, the user can click on the HTML button. In such a scenario, the user needs to pass multiple parameters such as, for example, HtmlTag (which denotes the type of the HTML tag), HtmlAttr (which denotes the attribute of the HTML tag), and Value (which denotes the text value of the attribute). By way of further example, for an HTML page having the login button as <button id="login_submit_btn" type="submit">, the values for the parameters can be: HtmlTag: button; HtmlAttr: id; and Value: login_submit_btn.

Accordingly, based on the above example fields, the API attempts to find the cascading style sheets (CSS) path and/or XPath, and once the CSS path and/or XPath is determined or obtained, a selenium org.openqa.selenium.WebDriver driver (driver.findElement(By.xpath(path)) or driver.findElement(By.cssSelector(path))) can be used to obtain the org.openqa.selenium.WebElement element instance and selenium element.click( ) function to carry out the job.

It is to be appreciated that this particular example code snippet shows just one example generation of an API, and alternative implementations of the process can be used in other embodiments.

As also detailed herein, one or more embodiments include utilizing one or more automation technologies. For example, at least one embodiment includes implementing an abstraction of the code of one or more automation technologies, which enables a testing user and/or team to write regression test cases according to one or more particular product needs without requiring technical knowledge of the automation technologies. Additionally, at least one embodiment includes enhancing a set of one or more predefined APIs based at least in part on the user's and/or tester's feedback.

Such an embodiment includes carrying out the creation of CSS and/or XPath query language. By way of example, an HTML page can include a login button as follows: <button id="login_submit_btn" type="submit">, and for this element, the CSS path would be $$(button [id*='login_submit_btn']). Additionally, one or more embodiments can include writing a method findPath(HtmlTag, HtmlAttr, Value), and in this method, such an embodiment can include appending values to the string and returning the string path based on the inputs provided.

Accordingly, using such an embodiment, the user (e.g., a developer and/or tester) does not need to know how to create a CSS or XPath, but merely need to pass at least one web element type and at least one attribute name as new API input.

Further, one or more embodiments include generating reusable test scripts which can be used in executing test cases for one or more products.

Figure 3:
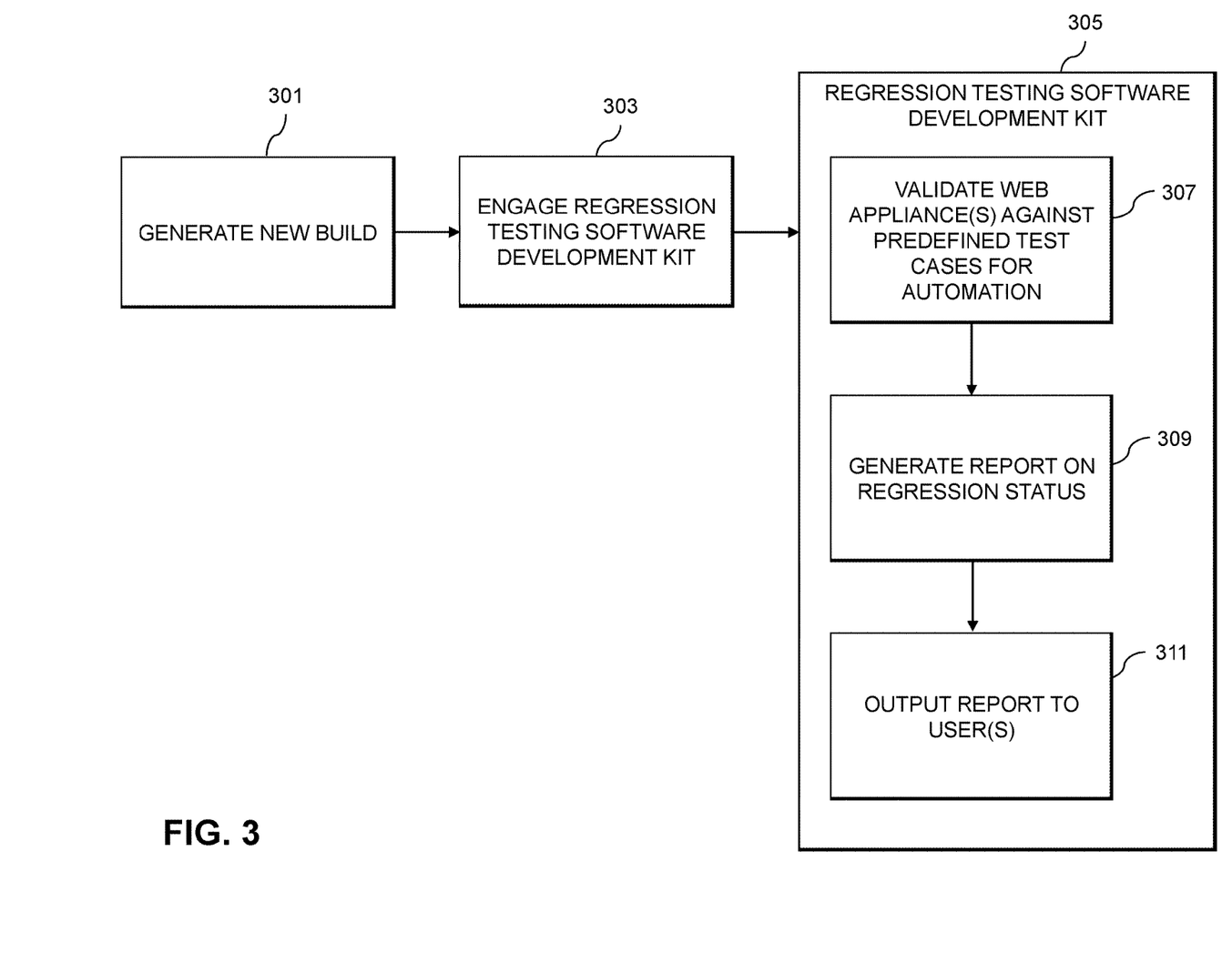
FIG. 3 shows integration with a build tool in an illustrative embodiment.

FIG. 3 shows integration with a build tool in an illustrative embodiment. By way of illustration, FIG. 3 depicts generating a new build being in step 301, and engaging a regression testing SDK 305 in step 303. As used herein, a build refers to a bundling of modules of a product into one single executable binary which can be deployed on any virtual machine. The regression testing SDK 305 validates web appliance(s) against predefined test cases for automation in step 307. As used herein, an appliance refers to a web-based product deployed on a system or an image on a virtual machine, which can be accessed through a web browser to access and use product functionality. Also, the regression testing SDK 305 generates a report on the regression status in step 309, and outputs the report to one or more users in step 311. Such a report can include the number of test cases and their description, which are executed for a particular appliance. The report can also include the status of test case execution (e.g., how many of test cases failed or succeeded).

Figure 4:
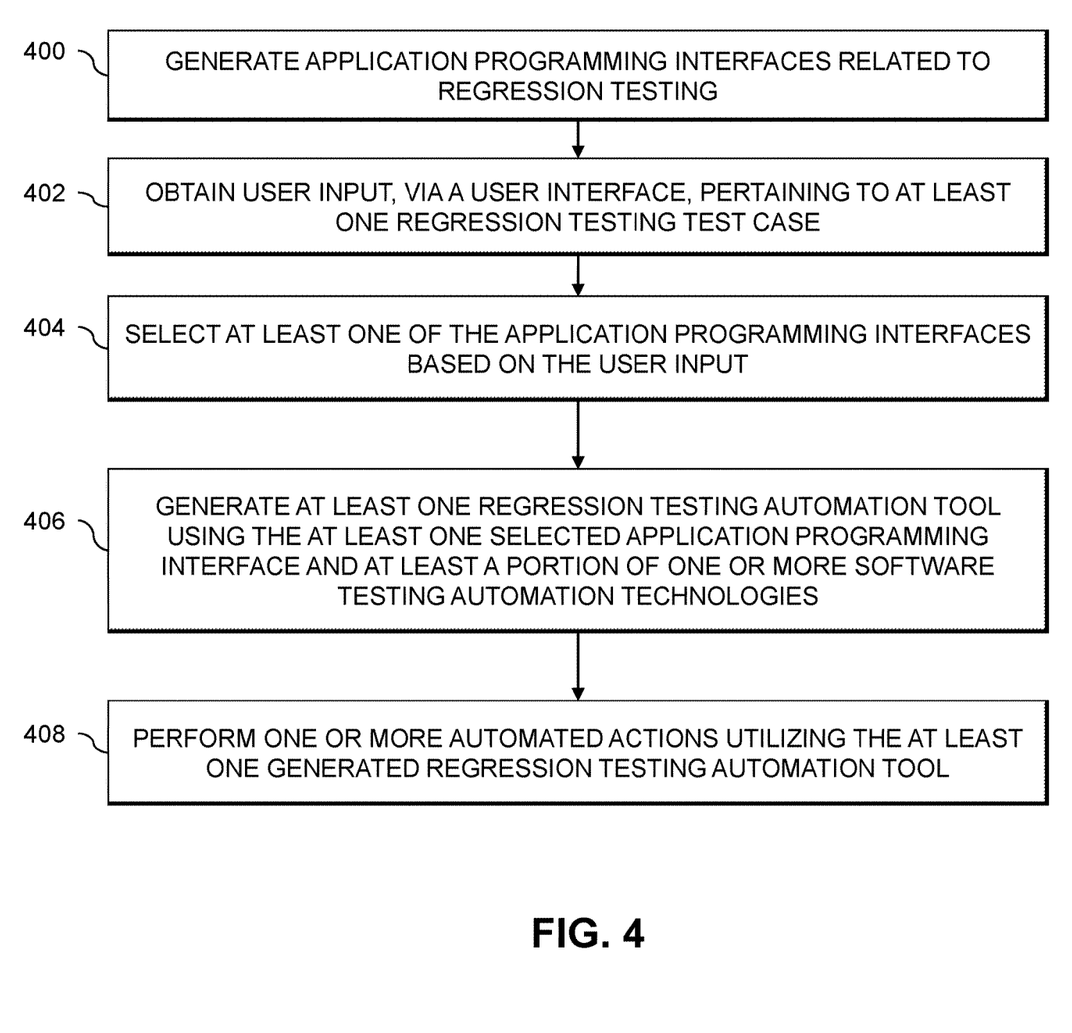
FIG. 4 is a flow diagram of a process for regression testing using automation technologies in an illustrative embodiment.

FIG. 4 is a flow diagram of a process for regression testing using automation technologies in an illustrative embodiment. It is to be understood that this particular process is only an example, and additional or alternative processes can be carried out in other embodiments.

In this embodiment, the process includes steps 400 through 408. These steps are assumed to be performed by the regression testing SDK 105 utilizing its modules 112, 114 and 116.

Step 400 includes generating multiple application programming interfaces related to regression testing. Step 402 includes obtaining user input, via at least one user interface, pertaining to at least one regression testing test case. In at least one example embodiment, the user input includes information pertaining to one or more web elements related to at least one regression testing task.

Step 404 includes selecting at least one of the multiple application programming interfaces based at least in part on the user input. In one or more embodiments, selecting the at least one application programming interface includes exposing, based at least in part on the user input, at least a portion of the multiple application programming interfaces to the user via the at least one user interface, and selecting the at least one application programming interface in response to a user selection processed via the at least one user interface.

Step 406 includes generating at least one regression testing automation tool using the at least one selected application programming interface and at least a portion of one or more software testing automation technologies. In at least one embodiment, generating the at least one regression testing automation tool includes generating and implementing one or more cascading style sheets inputs. Additionally or alternatively, in at least one embodiment, generating the at least one regression testing automation tool includes generating and implementing one or more extensible markup language path language inputs. Further, the techniques depicted in FIG. 4 can also include displaying, via the at least one user interface, at least one abstraction of the one or more software testing automation technologies.

Step 408 includes performing one or more automated actions utilizing the at least one generated regression testing automation tool. In one or more embodiments, performing the one or more automated actions includes executing the at least one regression testing test case using the at least one generated regression testing automation tool. Additionally or alternatively, in one or more embodiments, performing the one or more automated actions includes making the at least one generated regression testing automation tool accessible to the user via the at least one user interface.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to implement targeted APIs, in conjunction with automation technologies, to enable the creation of automated regression testing tools. These and other embodiments can effectively facilitate avoidance of problems associated with labor-intensive and error-prone manual testing processes common in conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
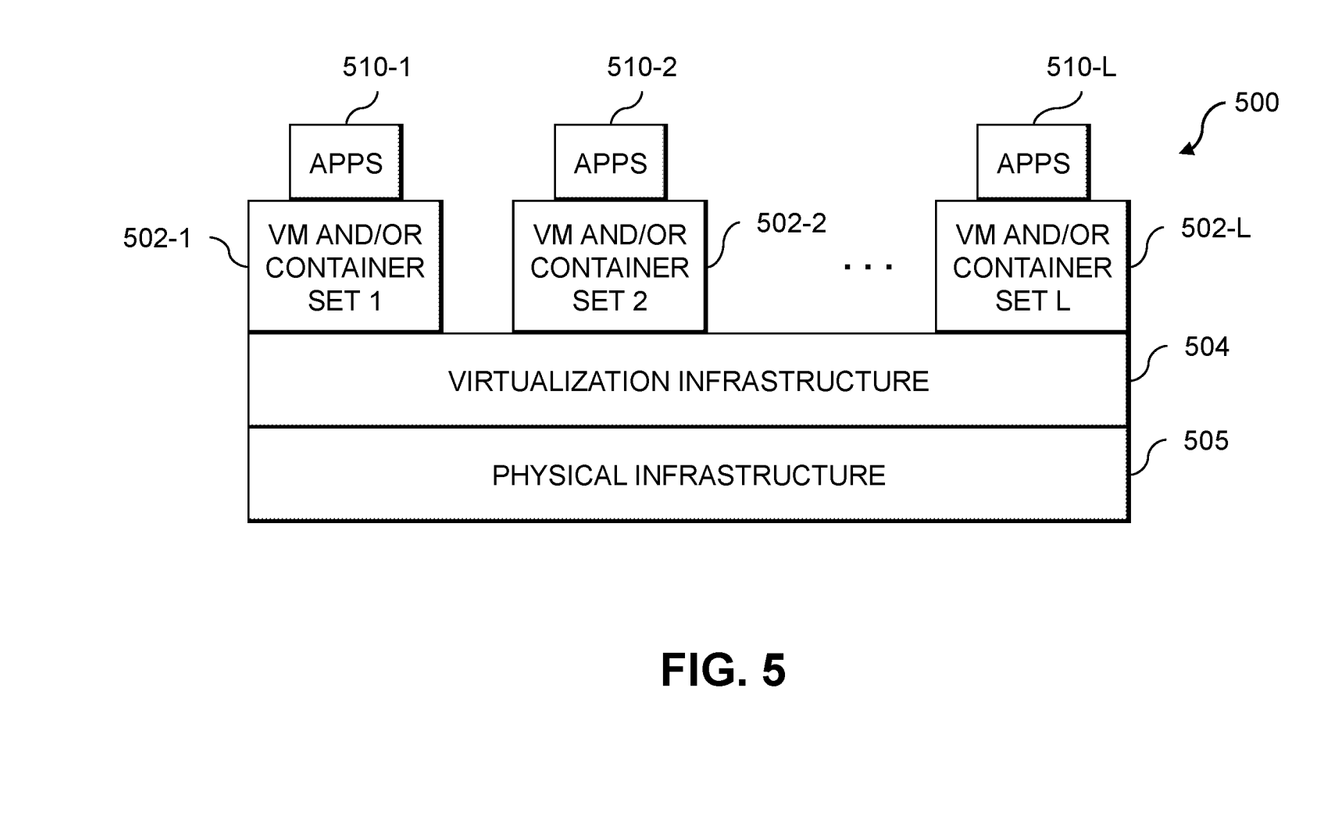
FIGS. 5 and 6 show examples of processing platforms that may be utilized to implement at least a portion of an information processing system in illustrative embodiments.
Figure 6:
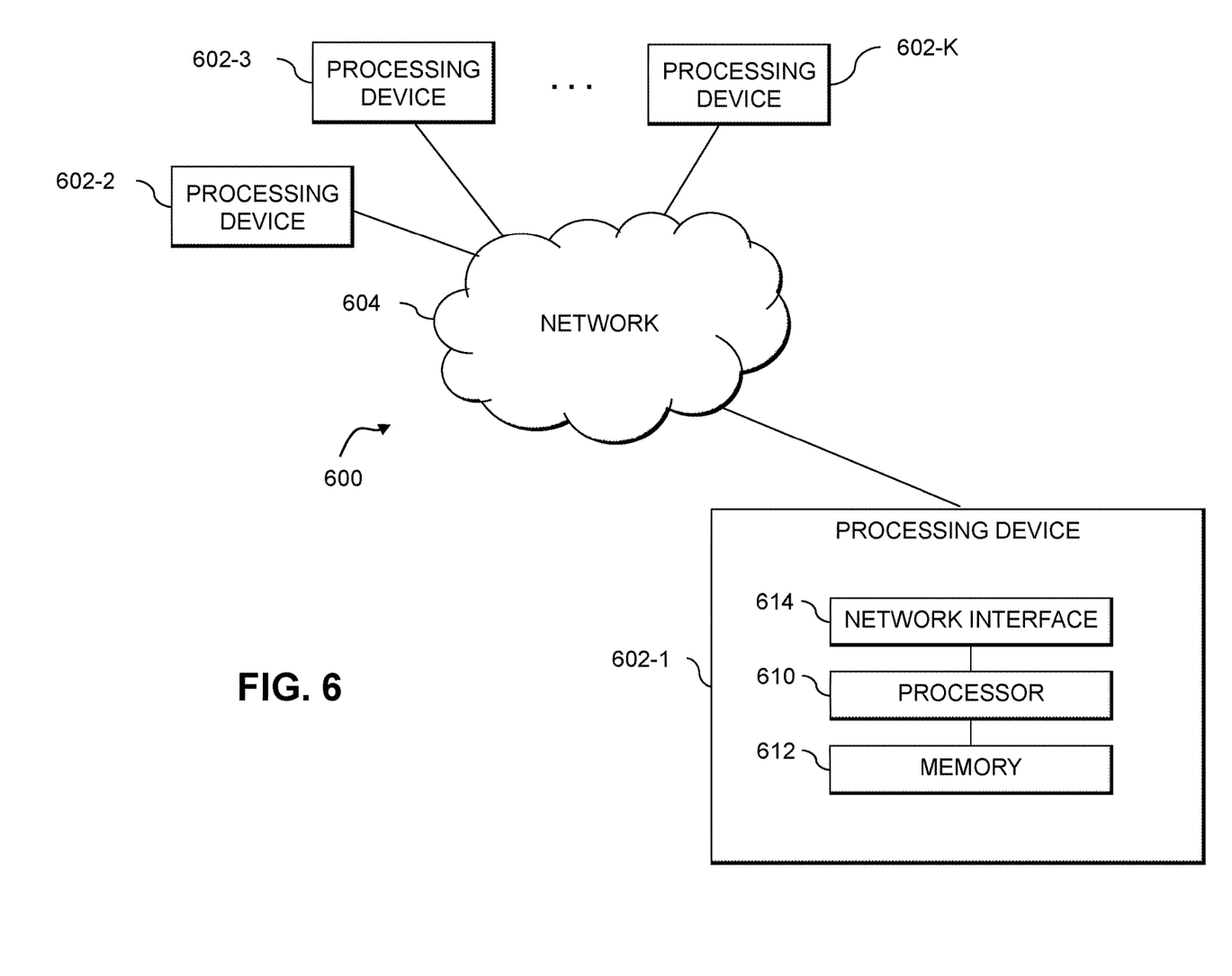

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

generating multiple application programming interfaces related to regression testing;

obtaining user input, via at least one user interface, pertaining to at least one regression testing test case;

selecting at least one of the multiple application programming interfaces based at least in part on the user input;

generating at least one regression testing automation tool using the at least one selected application programming interface and at least a portion of one or more software testing automation technologies, wherein generating the at least one regression testing automation tool comprises generating, based at least in part on input, provided by the user, for the at least one selected application programming interface comprising identifying information for at least one web element type and information pertaining to at least one attribute name, one or more cascading style sheets inputs and implementing at least a portion of the one or more cascading style sheets inputs; and performing one or more automated actions utilizing the at least one generated regression testing automation tool;

wherein the method is performed by at least one processing device comprising a processor coupled to a memory.

2. The computer-implemented method of claim 1, wherein generating the at least one regression testing automation tool comprises generating and implementing one or more extensible markup language path language inputs.

3. The computer-implemented method of claim 1, wherein selecting the at least one application programming interface comprises:
- exposing, based at least in part on the user input, at least a portion of the multiple application programming interfaces to the user via the at least one user interface; and
- selecting the at least one application programming interface in response to a user selection processed via the at least one user interface.

4. The computer-implemented method of claim 1, wherein performing the one or more automated actions comprises executing the at least one regression testing test case using the at least one generated regression testing automation tool.

5. The computer-implemented method of claim 1, wherein performing the one or more automated actions comprises making the at least one generated regression testing automation tool accessible to the user via the at least one user interface.

6. The computer-implemented method of claim 1, wherein the user input comprises information pertaining to one or more web elements related to at least one regression testing task.

7. The computer-implemented method of claim 1, further comprising:
- displaying, via the at least one user interface, at least one abstraction of the one or more software testing automation technologies.

8. A non-transitory processor-readable storage medium having stored therein program code of one or more software programs, wherein the program code when executed by at least one processing device causes the at least one processing device:
- to generate multiple application programming interfaces related to regression testing;
- to obtain user input, via at least one user interface, pertaining to at least one regression testing test case;
- to select at least one of the multiple application programming interfaces based at least in part on the user input;
- to generate at least one regression testing automation tool using the at least one selected application programming interface and at least a portion of one or more software testing automation technologies, wherein generating the at least one regression testing automation tool comprises generating, based at least in part on input, provided by the user, for the at least one selected application programming interface comprising identifying information for at least one web element type and information pertaining to at least one attribute name, one or more cascading style sheets inputs and implementing at least a portion of the one or more cascading style sheets inputs; and
- to perform one or more automated actions utilizing the at least one generated regression testing automation tool.

9. The non-transitory processor-readable storage medium of claim 8, wherein generating the at least one regression testing automation tool comprises generating and implementing one or more extensible markup language path language inputs.

10. The non-transitory processor-readable storage medium of claim 8, wherein selecting the at least one application programming interface comprises:
- exposing, based at least in part on the user input, at least a portion of the multiple application programming interfaces to the user via the at least one user interface; and
- selecting the at least one application programming interface in response to a user selection processed via the at least one user interface.

11. The non-transitory processor-readable storage medium of claim 8, wherein performing the one or more automated actions comprises executing the at least one regression testing test case using the at least one generated regression testing automation tool.

12. The non-transitory processor-readable storage medium of claim 8, wherein performing the one or more automated actions comprises making the at least one generated regression testing automation tool accessible to the user via the at least one user interface.

13. An apparatus comprising:
- at least one processing device comprising a processor coupled to a memory;
- the at least one processing device being configured:
  - to generate multiple application programming interfaces related to regression testing;
  - to obtain user input, via at least one user interface, pertaining to at least one regression testing test case;
  - to select at least one of the multiple application programming interfaces based at least in part on the user input;
  - to generate at least one regression testing automation tool using the at least one selected application programming interface and at least a portion of one or more software testing automation technologies, wherein generating the at least one regression testing automation tool comprises generating, based at least in part on input, provided by the user, for the at least one selected application programming interface comprising identifying information for at least one web element type and information pertaining to at least one attribute name, one or more cascading style sheets inputs and implementing at least a portion of the one or more cascading style sheets inputs; and
  - to perform one or more automated actions utilizing the at least one generated regression testing automation tool.

14. The apparatus of claim 13, wherein generating the at least one regression testing automation tool comprises generating and implementing one or more extensible markup language path language inputs.

15. The apparatus of claim 13, wherein selecting the at least one application programming interface comprises:
- exposing, based at least in part on the user input, at least a portion of the multiple application programming interfaces to the user via the at least one user interface; and
- selecting the at least one application programming interface in response to a user selection processed via the at least one user interface.

16. The apparatus of claim 13, wherein performing the one or more automated actions comprises executing the at least one regression testing test case using the at least one generated regression testing automation tool.

17. The apparatus of claim 13, wherein performing the one or more automated actions comprises making the at least one generated regression testing automation tool accessible to the user via the at least one user interface.

18. The apparatus of claim 13, wherein the at least one processing device is further configured:

to display, via the at least one user interface, at least one abstraction of the one or more software testing automation technologies.

19. The apparatus of claim 13, wherein the user input comprises information pertaining to one or more web elements related to at least one regression testing task.

20. The non-transitory processor-readable storage medium of claim 8, wherein the program code when executed by the at least one processing device causes the at least one processing device:
   to display, via the at least one user interface, at least one abstraction of the one or more software testing automation technologies.

\* \* \* \* \*